(No Model.) 2 Sheets—Sheet 1.
D. WEINSTOCK.
BABY CARRIAGE.
No. 567,669. Patented Sept. 15, 1896.
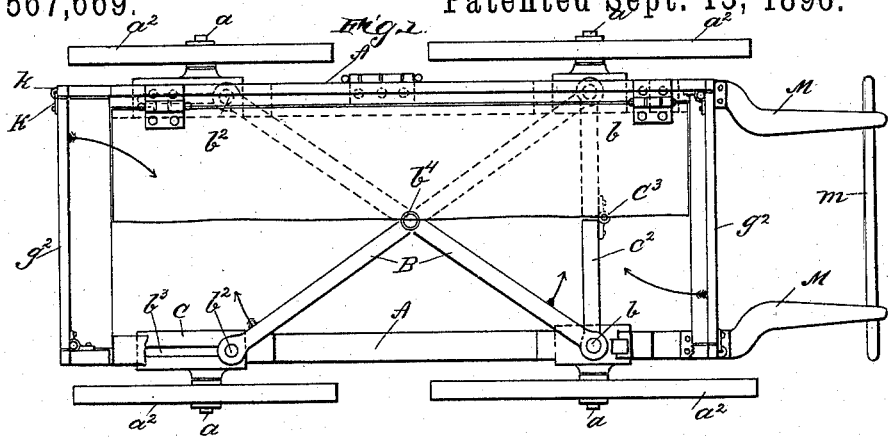
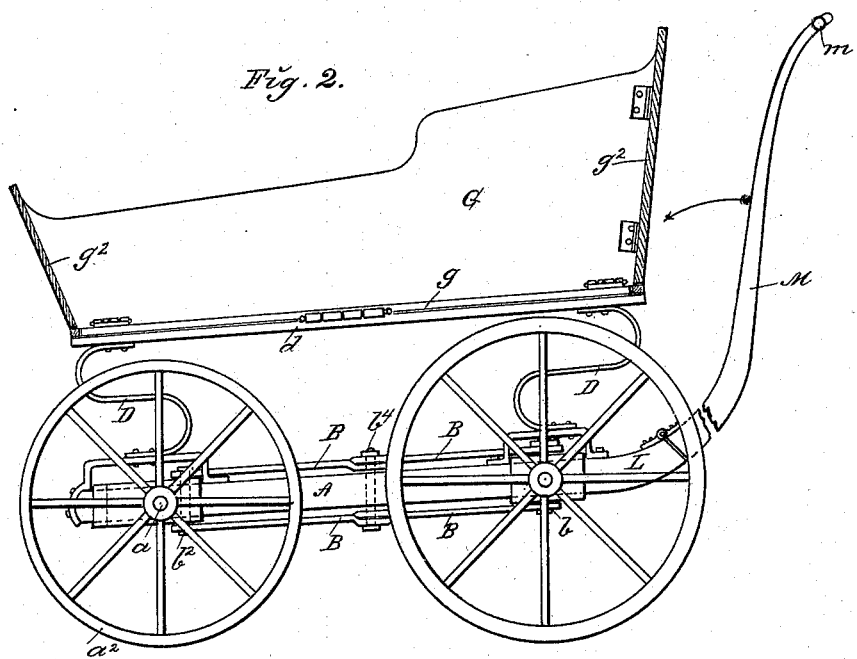
WITNESSES:
INVENTOR
Davis Weinstock
BY
Edgar Tate & Co
ATTORNEYS.

(No Model.) 2 Sheets—Sheet 2.

D. WEINSTOCK.
BABY CARRIAGE.

No. 567,669. Patented Sept. 15, 1896.

WITNESSES:

INVENTOR

UNITED STATES PATENT OFFICE.

DAVIS WEINSTOCK, OF NEW YORK, N. Y.

BABY-CARRIAGE.

SPECIFICATION forming part of Letters Patent No. 567,669, dated September 15, 1896.

Application filed March 5, 1896. Serial No. 581,967. (No model.)

*To all whom it may concern:*

Be it known that I, DAVIS WEINSTOCK, a citizen of the United States, and a resident of New York, in the county of New York and State of New York, have invented certain new and useful Improvements in Folding Baby-Carriages, of which the following is a specification, reference being had to the accompanying drawings, forming a part thereof, in which similar letters of reference indicate corresponding parts.

This invention relates to baby-carriages; and the object thereof is to provide a vehicle of this class the truck or frame of which is composed of two separate side bars, with which the wheels are connected, said side bars being connected by a pair of toggle-levers or lazy-tongs, so that they can be folded together, and the bed or body of which is composed of two sides, each of which is hinged to a longitudinal plate or bar, one of which is supported above each of the side bars of the truck or frame by means of springs, and a bottom which is hinged to one of said sides, and ends which are hinged to said sides, whereby the separate parts of the body or bed may be folded adjacent to the sides thereof and the sides folded adjacent to the wheels or the sides of the truck, and the truck-frame itself be then folded together.

The invention is fully disclosed in the following specification, of which the accompanying drawings form a part, in which—

Figure 3:
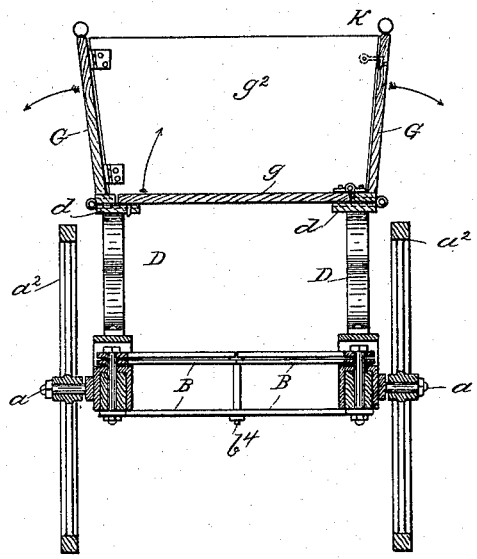
Figure 4:
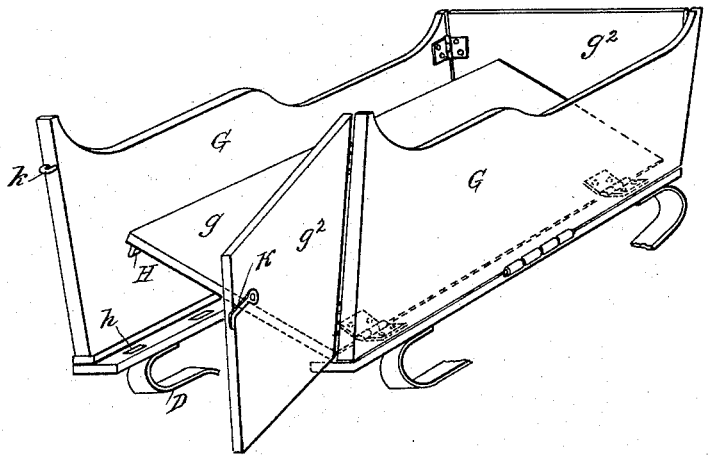

Figure 1 is a plan view of my improved baby-carriage with one side of the body or bed thereof and a portion of the bottom broken away; Fig. 2, a side view with the bed or body shown in longitudinal section; Fig. 3, a transverse central section; and Fig. 4, a perspective view of the bed or body, showing the manner of connecting the separate parts thereof.

In the practice of my invention I provide a truck or frame which comprises two side bars A, the separate ends of which are provided with shafts $a$, on which the wheels $a^2$ are mounted, and the side bars A are connected by means of a pair of toggle-levers or lazy-tongs, consisting of two pivotally-connected rods B, which are pivotally connected with one end of the side bars A at $b$, and also with the opposite ends of the side bars A at $b^2$, by means of pins which project into slots $b^3$, formed in the plates C.

In Figs. 2 and 3 I have shown two pairs of the toggle-levers or lazy-tongs, one of which is placed above and the other below the side bars A, and the pins $b$ and $b^2$ extend through the ends of the side bars and form the pivotal connection for both pairs of toggle-levers, and the slots $b^3$ also extend entirely through the corresponding ends of the side bars A. This construction is for the purpose of giving strength and stability to the frame or truck, but it is not absolutely necessary, and, if preferred, only one pair of toggle-levers need be employed.

The toggle-levers B are connected centrally by means of a pin or bolt $b^4$, and the side bars A are connected at one end, preferably at the rear end, by means of a cross-bar $C^2$, the ends of which are also mounted on the pivot-pins $b$, and which is composed of two sections hinged together at $C^3$, so that the bar $C^2$ may also fold inwardly when the side bars A are brought together.

Supported above each of the side bars A, by means of springs D, are plates $d$, to each of which is hinged one of the sides G of the body or bed, and in practice I also hinge to one of said sides the bottom $g$ of the body or bed, and the separate ends $g^2$ are also each hinged to one of the sides, and said ends may both be hinged to the same side or one of them may be hinged to each side, and the bottom on the side opposite this hinged connection is provided with depending projections H, which are adapted to enter corresponding slots or apertures $h$, formed in the corresponding plate $d$, and each of the ends $g^2$ is provided with a pivoted hook or catch K, which is adapted to engage with a loop or other fastening device $k$, which is secured to the side opposite to that to which the said end is hinged.

The side bars A are projected at one end, as shown at L in Fig. 2, and hinged thereto are arms M, which project upwardly, inwardly, and outwardly, and to which a cross-bar $m$ is connected in any desired manner, and the arms and the cross-bar $m$ constitute the handle by which the carriage is operated, and the cross-bar $m$ may be detachably connected with the arms M. As thus constructed it will be seen that the side bars A may be folded together whenever desired, and in this operation the separate end pieces of the bed or body are folded adjacent to the side of the bed or body to which they are hinged, and the bottom of said body is also raised and folded adjacent to the side to which it is hinged, and the arms M may also be folded inwardly, the cross-bar m being detached, and the sides G of the bed or body may then be folded outwardly adjacent to the wheels, and the entire frame of the truck or the side bars A may then be folded together, thus forming a compact whole, which may be carried from one point to another and any number of which may also be packed in a box for shipment or other purposes.

The entire carriage may be made of metal, if desired, or of any desired material, or a part thereof may be made of wood and the rest of metal, and my invention is not limited to the exact form, construction, and arrangement of the various parts thereof, as it is evident that changes in and modifications of the construction herein described may be made without departing from the spirit of my invention or sacrificing its advantages, and I reserve the right to make all such alterations in and modifications of the construction as fairly come within the scope of the invention.

It will also be apparent that my invention is applicable to the construction of other light vehicles as well as to the construction of baby-carriages, and the said invention is therefore not limited to the construction of baby-carriages alone, as herein shown and described.

Having fully described my invention, I claim as new and desire to secure by Letters Patent—

1. In a baby-carriage or other light vehicle, a frame or truck in connection with which the wheels are mounted, said frame or truck being composed of two side bars, which are connected by a pair of diagonal levers, and which are adapted to be folded together, and said side bars being also connected by a sectional cross-bar which is pivotally connected with each, and the separate sections of which are hinged together and each of said side bars being provided with a plate which is supported thereover, by means of springs, and on which the bed or body is mounted, said bed or body being composed of sides which are hinged to said plates, and a bottom and two ends, said bottom and ends being hinged to said sides, substantially as shown and described.

2. In a baby-carriage or other light vehicle, a frame or truck in connection with which the wheels are mounted, said frame or truck being composed of two side bars, which are connected by a pair of diagonal levers, and which are adapted to be folded together, and said side bars being also connected by a sectional cross-bar which is pivotally connected with each, and the separate sections of which are hinged together and each of said side bars being provided with a plate which is supported thereover, by means of springs, and on which the bed or body is mounted, said bed or body being composed of sides which are hinged to said plates, and a bottom and two ends, said bottom and ends being hinged to said sides, and means connected with said bottom and said ends, whereby they are secured in place so as to form a bed or body, substantially as shown and described.

3. A baby-carriage or other light vehicle, consisting of a truck or frame which is composed of two separate side bars, with which the wheels are connected, said side bars being connected by a pair of diagonal levers so that they can be folded together, and said side bars being also connected by a sectional cross-bar which is pivotally connected with each, and the separate sections of which are hinged together and a bed or body which is secured to or connected with plates which are supported above said side bars by means of springs, said bed or body being composed of sides, which are hinged to said plates, and a bottom or ends which are hinged to said sides, whereby the separate parts of the body or bed may be folded, in connection with the sides, and the sides folded adjacent to the sides of the truck or frame, substantially as shown and described.

4. A baby-carriage or other light vehicle, consisting of a truck or frame which is composed of two separate side bars, with which the wheels are connected, said side bars being connected by a pair of diagonal levers so that they can be folded together, and said side bars being also connected by a sectional cross-bar which is pivotally connected with each, and the separate sections of which are hinged together and a bed or body which is secured to or connected with plates which are supported above said side bars by means of springs, said bed or body being composed of sides, which are hinged to said plates, and a bottom or ends which are hinged to said sides, whereby the separate parts of the body or bed may be folded, in connection with the sides, and the sides folded adjacent to the sides of the truck or frame, and said side bars being provided with projections to which are hinged arms, which project inwardly and upwardly and outwardly, and which may also be folded over the truck or frame, substantially as shown and described.

In testimony that I claim the foregoing as my invention I have signed my name, in presence of the subscribing witnesses, this 4th day of March, 1896.

DAVIS WEINSTOCK.

Witnesses:
C. GERST,
F. V. KIRCHHOFF.